(12) United States Patent
Fey

(10) Patent No.: US 11,525,415 B2
(45) Date of Patent: Dec. 13, 2022

(54) METHOD AND PROCESSING UNIT FOR CONTROLLING AN INTERNAL COMBUSTION ENGINE

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/374,427

(22) Filed: Jul. 13, 2021

(65) Prior Publication Data

US 2022/0018299 A1    Jan. 20, 2022

(30) Foreign Application Priority Data

Jul. 15, 2020   (DE) ...................... 10 2020 208 838.1

(51) Int. Cl.
*F01N 9/00*   (2006.01)
*F02D 41/02*  (2006.01)

(52) U.S. Cl.
CPC ......... *F02D 41/0235* (2013.01); *F01N 9/005* (2013.01); *F01N 2900/0406* (2013.01); *F02D 2200/08* (2013.01)

(58) Field of Classification Search
CPC .. F02D 41/0235; F02D 2200/08; F01N 9/005; F01N 2900/0406
See application file for complete search history.

(56) References Cited

U.S. PATENT DOCUMENTS

| | | | | |
|---|---|---|---|---|
| 2003/0051463 | A1* | 3/2003 | Kobayashi | .......... F02D 41/0235 60/274 |
| 2004/0144079 | A1* | 7/2004 | Nagai | ................. F02D 41/1465 60/276 |
| 2014/0041367 | A1* | 2/2014 | Balthes | .................. F02M 26/10 60/274 |
| 2015/0152769 | A1* | 6/2015 | Aoki | ................... F02D 41/0235 73/114.75 |

(Continued)

FOREIGN PATENT DOCUMENTS

| | | | | |
|---|---|---|---|---|
| DE | 10334922 | A1 * | 2/2004 | ............. F01N 9/005 |
| DE | 10339063 | A1 | 2/2005 | |

(Continued)

*Primary Examiner* — Matthew T Largi
(74) *Attorney, Agent, or Firm* — Michael Best & Friedrich LLP

(57) ABSTRACT

A method for controlling an internal combustion engine with a catalytic converter for exhaust-gas aftertreatment, comprising specification of a target fill level profile is proposed, which fluctuates between an upper threshold value and a lower threshold value, of at least one exhaust-gas component that can be stored in the catalytic converter, determination of a present fill level of the at least one exhaust-gas component in the catalytic converter on the basis of a theoretical catalytic converter model, and control of the internal combustion engine so as to generate an exhaust gas with a target concentration of the at least one exhaust-gas component such that a deviation between the present fill level and the present target fill level in accordance with the target fill level profile is reduced. A processing unit and a (Continued)

computer program product for carrying out a method of said type, and a vehicle which is configured for carrying out the method, are likewise proposed.

14 Claims, 2 Drawing Sheets

(56) References Cited

U.S. PATENT DOCUMENTS

2018/0202336 A1\* 7/2018 Kaneko ................. F01N 3/0864

FOREIGN PATENT DOCUMENTS

| DE | 102006051834 A1 | 7/2007 |
|----|-----------------|--------|
| DE | 102006056496 A1 | 7/2007 |
| DE | 102006061684 A1 | 7/2008 |
| DE | 102016222418 A1 | 5/2018 |

\* cited by examiner

METHOD AND PROCESSING UNIT FOR CONTROLLING AN INTERNAL COMBUSTION ENGINE

BACKGROUND OF THE INVENTION

The present invention relates to a method for controlling an internal combustion engine, and to a processing unit and a computer program for carrying out said method.

Modern motor vehicles are commonly equipped with catalytic converters for the aftertreatment of an exhaust gas of an internal combustion engine. In many cases, these catalytic converters are monitored and/or controlled in closed-loop fashion.

In the case of an incomplete combustion of the air/fuel mixture in an Otto engine, numerous combustion products are emitted aside from nitrogen ($N_2$), carbon dioxide ($CO_2$) and water ($H_2O$), of which combustion products hydrocarbons (HC), carbon monoxide (CO) and nitrogen oxides ($NO_x$) are limited by legislation. The applicable exhaust-gas limit values for motor vehicles can, in the current state of the art, be adhered to only by way of catalytic exhaust-gas aftertreatment. Said pollutant components can be converted through the use of, for example, a three-way catalytic converter.

In three-way catalytic converters, a simultaneously high conversion rate for HC, CO and $NO_x$ is attained only in a narrow lambda range around the stoichiometric operating point (lambda=1), the so-called "catalytic converter window" or "conversion window".

For the operation of the three-way catalytic converter in the conversion window, it is typically the case in modern engine control systems that closed-loop lambda control is used, which may be based on the signals of lambda probes arranged upstream and downstream of the three-way catalytic converter. For the closed-loop control of the air ratio lambda, which is a measure for the composition of the fuel/air ratio of the internal combustion engine, the oxygen content of the exhaust gas upstream of the three-way catalytic converter may be measured by means of an inlet-side lambda probe arranged there. In a manner dependent on this measured value, the closed-loop control may for example vary the fuel quantity or injection duration, which is predefined in the form of a base value by a pilot control function.

In the context of the pilot control, base values of fuel quantities to be injected are predefined in a manner dependent on, for example, rotational speed and load of the internal combustion engine. For even more exact closed-loop control, the oxygen concentration of the exhaust gas downstream of the three-way catalytic converter may additionally be detected by means of a further lambda probe. The signal of this outlet-side lambda probe can be used for master control, which is superposed on the closed-loop lambda control upstream of the three-way catalytic converter based on the signal of the inlet-side lambda probe. As a lambda probe arranged downstream of the three-way catalytic converter, use is generally made of a two-step lambda probe, which has a very steep characteristic curve at lambda=1 and can therefore indicate lambda=1 very exactly.

Aside from the master control, which generally corrects only small deviations from lambda=1 and which is configured to be relatively slow, another functionality for large deviations from lambda=1, in the form of lambda pilot control, may be provided in order that the conversion window is reached again quickly, which is important for example after overrun cut-off phases, in which the three-way catalytic converter is charged with oxygen. The charging with oxygen impairs the $NO_x$ conversion.

Owing to the oxygen storage capacity of the three-way catalytic converter, lambda=1 may prevail downstream of the three-way catalytic converter for a further several seconds after rich or lean lambda has been set upstream of the three-way catalytic converter. This characteristic of the three-way catalytic converter of temporarily storing oxygen is utilized in order to compensate brief deviations from lambda=1 upstream of the three-way catalytic converter. If lambda not equal to 1 prevails upstream of the three-way catalytic converter for a relatively long period, the same lambda will also take effect downstream of the three-way catalytic converter as soon as, in the case of lambda>1 (excess of oxygen), the oxygen fill level exceeds the oxygen storage capacity, or as soon as, in the case of lambda<1, there is no longer any oxygen stored in the three-way catalytic converter.

At this point in time, a two-step lambda probe downstream of the three-way catalytic converter then also indicates a departure from the conversion window. Up to this point in time, the signal of the lambda probe downstream of the three-way catalytic converter however does not indicate the impending breakthrough, and master control based on this signal therefore often first reacts so late that the fuel metering can no longer react in good time before a breakthrough. As a consequence, increased emissions occur. Such closed-loop control concepts therefore have the disadvantage that they identify a departure from the conversion window, on the basis of the voltage of the two-step lambda probe downstream of the three-way catalytic converter, only at a late point in time.

In order to prevent the oxygen store from being emptied entirely, that is to say the stored oxygen being completely consumed, cyclic closed-loop control concepts are also known in which exhaust gas is generated alternately in a slightly rich and a slightly lean lambda range. In this way, the oxygen store is filled in the lean operating phases and is consumed in the rich operating phases, which furthermore leads to more uniform aging of the catalytic converter as a whole and thus to a lengthened service life overall. Such closed-loop control is described for example in DE 10 2006 061 684 A1.

DE 10 2016 222 418 A1 has disclosed a model-based closed-loop control concept in which in each case one lambda sensor is arranged upstream and downstream of the catalytic converter in a flow direction of the exhaust gas and a catalytic converter model is used to mathematically determine the lambda value that is measured downstream of the catalytic converter. If the actually measured lambda value deviates from the calculated lambda value, the catalytic converter model is adapted. In particular, here, a fill level of one or more exhaust-gas components, in particular of oxygen, in the catalytic converter is modeled.

SUMMARY OF THE INVENTION

The invention proposes a method for controlling an internal combustion engine with a catalytic converter for exhaust-gas aftertreatment, a processing unit and a computer program for carrying out said method, and a vehicle, having the features of the independent patent claims. The subclaims and the following description relate to advantageous configurations.

The method according to the invention for controlling an internal combustion engine with a catalytic converter for exhaust-gas aftertreatment comprises specification of a target fill level profile, which fluctuates between an upper threshold value and a lower threshold value, of at least one exhaust-gas component that can be stored in the catalytic converter, determination of a present fill level of the at least one exhaust-gas component in the catalytic converter on the basis of a theoretical catalytic converter model, and control of the internal combustion engine so as to generate an exhaust gas with a target concentration of the at least one exhaust-gas component such that a deviation between the present fill level and the present target fill level in accordance with the target fill level profile is reduced. Through the modulation of the target fill level, an impending catalytic converter deactivation can be counteracted, wherein the adaptation of the modulation prevents a breakthrough of non-converted exhaust gas through the catalytic converter.

It is preferable here if the determination of the present fill level comprises a determination of the fill level of multiple sub-volumes of the catalytic converter, which are in particular arranged in series in an exhaust-gas flow direction, and the control of the internal combustion engine is performed such that the greatest deviation between the determined fill level of a sub-volume of the catalytic converter and the target fill level thereof is reduced. In this way, an impending breakthrough of non-converted exhaust gas can be more easily identified and correspondingly prevented.

The modeling of the reaction kinetics of the catalytic converter, and the subdivision into multiple zones, make it possible for impending breakthroughs of non-converted exhaust gas through the catalytic converter owing to the modulation to be identified on the basis of present state variables of the catalytic converter model. The method therefore advantageously comprises an immediate implementation of a change between raising and lowering of the target fill level independently of the specified target fill level profile if a breakthrough is impending. The modulation can thus be adapted such that the oxygen delivery capacity or the oxygen storage capacity of the catalytic converter is optimally utilized without breakthroughs actually occurring. Furthermore, the modeling of the reaction kinetics of the catalytic converter allows an activation of the modulation only when required, for example if a catalytic converter deactivation is impending. This demand is not identified by previous concepts, and the modulation is therefore always active.

In particular, the lower threshold value of the target fill level profile is selected such that a minimum component delivery capacity of the catalytic converter is not undershot, and the upper threshold value of the target fill level profile is selected such that a maximum component storage capacity of the catalytic converter is not overshot. This serves for achieving the aim of preventing breakthroughs.

The method advantageously comprises an immediate implementation of a change between raising and lowering of the target fill level independently of the specified target fill level profile if an undershooting of the minimum component delivery capacity of the catalytic converter is impending or if an overshooting of the maximum component storage capacity of the catalytic converter is impending. In this way, breakthroughs can be counteracted at an early point in time. For example, it can be identified that a breakthrough is impending if a breakthrough threshold that precedes the minimum or maximum value is reached. The interval between said breakthrough threshold and the respective minimum or maximum value is preferably set in a manner dependent on the gradient with respect to time of the concentration, that is to say the greater the gradient with respect to time of the concentration, the greater the interval between the breakthrough threshold and the minimum or maximum value respectively, such that a sufficient reaction time remains.

The method preferably furthermore comprises a determination of a concentration of the at least one exhaust-gas component downstream of the catalytic converter on the basis of a measured value, and a comparison of the concentration with an upper and a lower concentration threshold value, wherein a change between raising and lowering of the target fill level in accordance with the specified target fill level profile is performed only if this forces the detected concentration away from the closest concentration threshold value. It is thus possible to prevent the modulation of the catalytic converter fill level leading to undesired breakthroughs of non-converted exhaust gas. The concentration of the exhaust-gas component may for example be mathematically derived by means of a lambda sensor or from the lambda value.

The method advantageously furthermore comprises an immediate implementation of a change between raising and lowering of the target fill level independently of the specified target fill level profile if the upper concentration threshold value is overshot or the lower concentration threshold value is undershot, and an updating of the theoretical catalytic converter model using the measured value. In this way, a possibly occurring breakthrough is identified and expediently counteracted.

The concentration thresholds are likewise suitable for the determination of an impending breakthrough. The method therefore advantageously furthermore comprises an immediate implementation of a change between raising and lowering of the target fill level independently of the specified target fill level profile if an overshooting of the upper concentration threshold value is impending or an undershooting of the lower concentration threshold value is impending. In this way, an impending breakthrough is identified and expediently counteracted.

The method preferably comprises a reduction in size of the value range enclosed by the upper and the lower threshold value of the target fill level profile, that is to say of an amplitude of the fluctuation, if the concentration overshoots the upper concentration threshold value or the concentration undershoots the lower concentration threshold value, and/or a breakthrough is impending, at least two times, three times or four times within a specifiable period of time, which is selected in particular from a range between 5 seconds and 5 minutes. Here, the adaptation of the amplitude is performed in particular if there has been an impending breakthrough, or a breakthrough has actually been detected, several times in the same direction (that is to say rich exhaust gas several times or a lean exhaust gas several times). A reduction of the amplitude may advantageously also be provided in the case of impending or actual breakthroughs with alternating direction following one another in quick succession, because such alternating breakthroughs may be caused by a fundamentally excessively large modulation amplitude. By means of the adaptation only after multiple impending or actual breakthroughs, optimum utilization of the storage and delivery capacity can be made possible. In particular, a one-off impending or actual breakthrough does not reliably demonstrate that the delivery or storage capacity of the catalytic converter has been incorrectly estimated, and may much more likely indicate incorrect modeling of the present fill level. Only in the event of multiple impending or actual breakthroughs is it likely that an incorrectly estimated storage or delivery capacity of the catalytic converter is the reason for the repeated breakthroughs. Correspondingly, after repeated breakthroughs have been identified, the method can be adapted such that this is prevented in future. For this purpose, for example, the upper threshold value of the target fill level profile is lowered if the corresponding exhaust-gas component repeatedly overshoots the upper concentration threshold value downstream of the catalytic converter, or the lower threshold value of the target fill level profile is raised if the exhaust-gas component falls below the lower concentration threshold value.

In particular, the fill level is in each case in relation to a maximum storage or delivery capacity of the catalytic converter with regard to the at least one exhaust-gas component. This reduces the processing outlay and the adaptation to different catalytic converter dimensioning configurations. It is preferably then the case that the upper threshold value of the fill level is less than one and the lower threshold value of the fill level is greater than zero. In this way, a breakthrough of non-converted exhaust gas is reliably avoided.

The method preferably comprises a determination of the upper and lower threshold values of the fill level and/or a determination of the concentration threshold values in a manner dependent on at least one state variable of the catalytic converter, in particular selected from a temperature, an aging value and an exhaust-gas mass flow flowing through the catalytic converter, and/or a present operating state of the internal combustion engine, in particular selected from a present load demand, a diagnostic function and a temperature. In this way, particularly relevant influential variables that have a decisive influence on the reaction kinetics in the catalytic converter are taken into consideration.

In summary, it can be stated that the major advantage of the present invention is the adaptive component of the modulation. The modeling of the reaction kinetics of the catalytic converter, and the subdivision into multiple zones, make it possible for impending breakthroughs of non-converted exhaust gas through the catalytic converter owing to the modulation to be identified on the basis of present state variables of the catalytic converter model. The modulation can thus be adapted such that the oxygen delivery capacity or the oxygen storage capacity of the catalytic converter is optimally utilized without breakthroughs actually occurring. This is a major advantage in relation to DE 10 2006 061 684 A1, in which a reduction of the threshold values for the oxygen fill level is provided only in the event of an actual breakthrough. Furthermore, the modeling of the reaction kinetics of the catalytic converter allows an activation of the modulation only when required, for example if a catalytic converter deactivation is impending. This demand is not identified by previous concepts, and the modulation is therefore always active.

A processing unit according to the invention, for example a control unit of a motor vehicle, is configured, in particular in terms of programming technology, to carry out a method according to the invention.

The implementation of a method according to the invention in the form of a computer program or computer program product with program code for carrying out all of the method steps is also advantageous, because this entails particularly low costs, in particular if an executing control unit is also used for other tasks and is therefore present in any case. Suitable data carriers for providing the computer program are in particular magnetic, optical and electrical memories, such as for example hard drives, flash memories, EEPROMs, DVDs and others. A download of a program via computer networks (Internet, intranet, etc.) is also possible.

A vehicle according to the invention is configured for carrying out the method according to the invention and, for this purpose, comprises an internal combustion engine, an exhaust-gas aftertreatment system and a processing unit. The vehicle correspondingly benefits from the features of the method.

BRIEF DESCRIPTION OF THE DRAWINGS

Further advantages and configurations of the invention will emerge from the description and the appended drawing.

The invention is illustrated schematically in the drawing on the basis of an exemplary embodiment, and will be described below with reference to the drawing.

DETAILED DESCRIPTION

Figure 1:
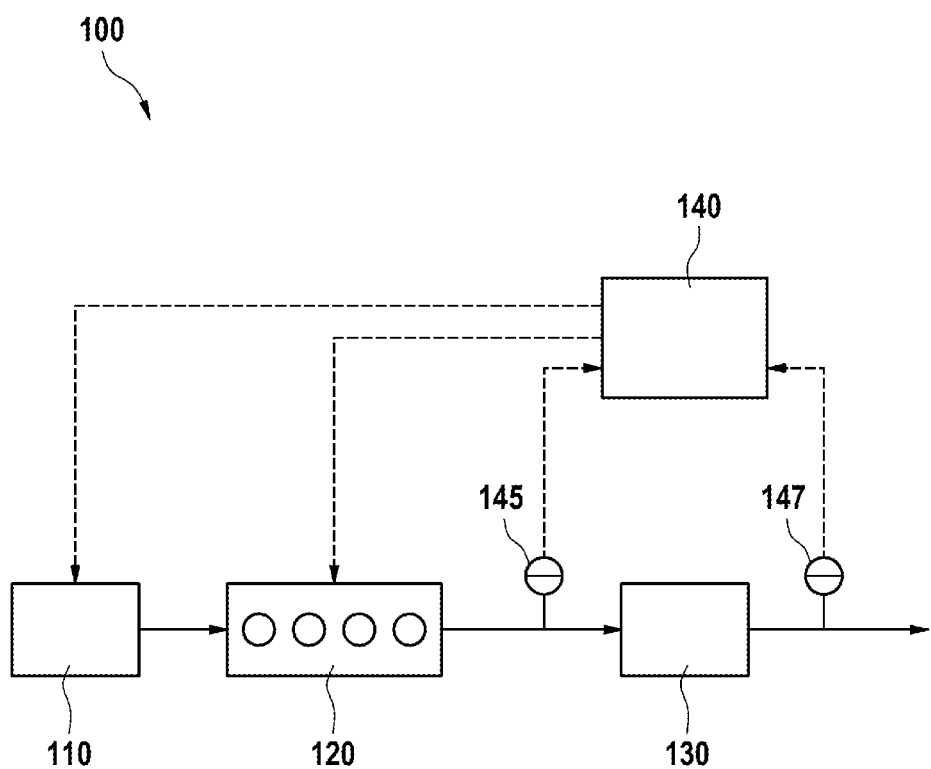
FIG. 1 shows an arrangement with an internal combustion engine which is configured for carrying out an advantageous configuration of a method according to the invention, in a schematic illustration.

In FIG. 1, an arrangement which is configured for carrying out an advantageous configuration of a method according to the invention and which can be arranged for example in a vehicle is shown in a schematic illustration and is denoted as a whole by 100.

The arrangement 100 comprises an internal combustion engine 120, for example a diesel or Otto engine, a fuel treatment device 110, an exhaust-gas catalytic converter 130, which may for example be in the form of a three-way catalytic converter, a processing unit 140, for example an engine control unit (ECU), and sensors 145, 147, which are provided for example in the form of lambda sensors, thermocouples, pressure sensors and/or measuring units for concentrations, temperatures, pressures or other physical or chemical variables that can describe or influence a state of an exhaust-gas system.

In particular, the invention uses modeling of the reaction kinetics of reactions taking place in the catalytic converter 130 and of the storage of exhaust-gas components, in particular oxygen, in the catalytic converter 130 during the operation of the internal combustion engine 120. For this purpose, provision may be made for the present state variables of the catalytic converter to be detected. These are for example fill levels such as the oxygen fill level or the fill level of rich gas components or a fill level distribution in the catalytic converter, the storage capacity of the catalytic converter and the mean temperature of the catalytic converter or a temperature distribution in the catalytic converter. With these state variables of the theoretical catalytic converter model, which replicates the development over time of the oxygen fill level of the real catalytic converter 130 during the operation of the internal combustion engine 120, a modulation of a target fill level in accordance with a target fill level profile is adapted to the real operating conditions such that breakthroughs of rich or lean exhaust gas through the catalytic converter 130 are prevented.

In general, in a modulation of the target fill levels, provision is made for the respectively present target fill level to lie between an upper and a lower threshold value and to vary over time such that the target fill level fluctuates between the upper and the lower threshold value. In other words, it is the intention for the corresponding exhaust-gas component to alternately be increasingly stored in the catalytic converter 130 (that is to say for the fill level to rise) and for a net discharge of said exhaust-gas component from the catalytic converter 130 to occur (that is to say for more to be removed from the catalytic converter than is introduced by fresh exhaust gas, such that the fill level falls) in a subsequent phase. In particular, a present target fill level thus moves around a substantially constant target fill level averaged over time. The interval between the upper and the lower threshold value accordingly corresponds to the amplitude of the target fill level modulation. A frequency of the modulation arises from the time interval between two changes in direction of the modulation, that is to say the points in time at which the controller of the internal combustion engine stipulates a change from the generation of a rich exhaust gas to generation of a lean exhaust gas or vice versa. By means of such modulation, it is possible to prevent the catalytic converter 130 from being deactivated owing to unilateral loading. For example, it is disadvantageous if particular storage sites, for example in a zone at the inlet of the catalytic converter 130, remain occupied by rich-gas components over long periods of time. If this is the case, it can for example require a large amount of energy to remove the rich-gas component from the corresponding storage site again, and the conversion performance of the catalytic converter 130 can fall, which can in turn lead to increased pollutant emissions. It is therefore advantageous for such storage sites to be emptied at regular intervals. This is possible in particular by means of a modulation of the target fill levels of the catalytic converter 130.

In particular, the thus ascertained theoretical values relating to the fill level of the catalytic converter 130 can be compared with real measurable variables, in particular exhaust-gas compositions downstream of the catalytic converter 130 but also upstream of the catalytic converter 130, and the modulation of the target fill level can be adapted on the basis of a deviation or correspondence between theoretically ascertained state variables and state variables ascertained by measurement. If, for example, the target fill level profile specifies a change from an operating phase in which the internal combustion engine 120 generates a rich exhaust gas to an operating phase in which the internal combustion engine 120 is to generate a lean exhaust gas, whilst at the same time a measured value of the sensor 147 downstream of the catalytic converter indicates that lean exhaust gas is already exiting the catalytic converter 130, it is provided in advantageous configurations of the method according to the invention that the target fill level profile is adapted accordingly and the internal combustion engine 120 is not controlled so as to generate an even leaner exhaust gas.

Such an adaptation may lie in particular in a frequency adaptation, in the case of which corresponding phases in which the internal combustion engine is controlled so as to generate a rich or lean exhaust gas respectively are lengthened or shortened if the sensor data do not correspond to the expected model-based values. In advantageous refinements, it is correspondingly conversely the case that the internal combustion engine 120 is also not controlled so as to enrich the exhaust-gas mixture if the sensor 147 is already indicating a rich exhaust gas.

Furthermore, in some configurations, it is provided that the amplitude of the modulation of the target fill level is adjusted or adapted. By means of the amplitude of the modulation, it is possible to influence the speed at which a zone in which the corresponding storage sites for exhaust-gas components are being emptied or filled moves through the volume of the catalytic converter 130. By contrast, the frequency of the modulation influences the depth to which the corresponding zone penetrates into the volume of the catalytic converter 130.

In advantageous configurations of the method according to the invention, it is possible by means of the theoretical catalytic converter model to identify when a deactivation of the catalytic converter 130 is impending, and the modulation of the target fill level can be activated when this is the case. By contrast, if a deactivation of the catalytic converter 130 is not impending, the target fill level can remain constant, such that no alternating enrichment and leaning of the exhaust gas of the internal combustion engine 120 is necessary. In other words, the amplitude of the modulation can then be zero, or the upper and the lower threshold value for the target fill level of the catalytic converter 130 can be equal.

By means of this approach, improved correlation of the modeled and real state variables of the catalytic converter can be achieved. In this way, in turn, the fill level of the catalytic converter can be better adjusted. The emissions can thus be further reduced. More stringent legal requirements can be adhered to with lower costs for the catalytic converter.

Figure 2:
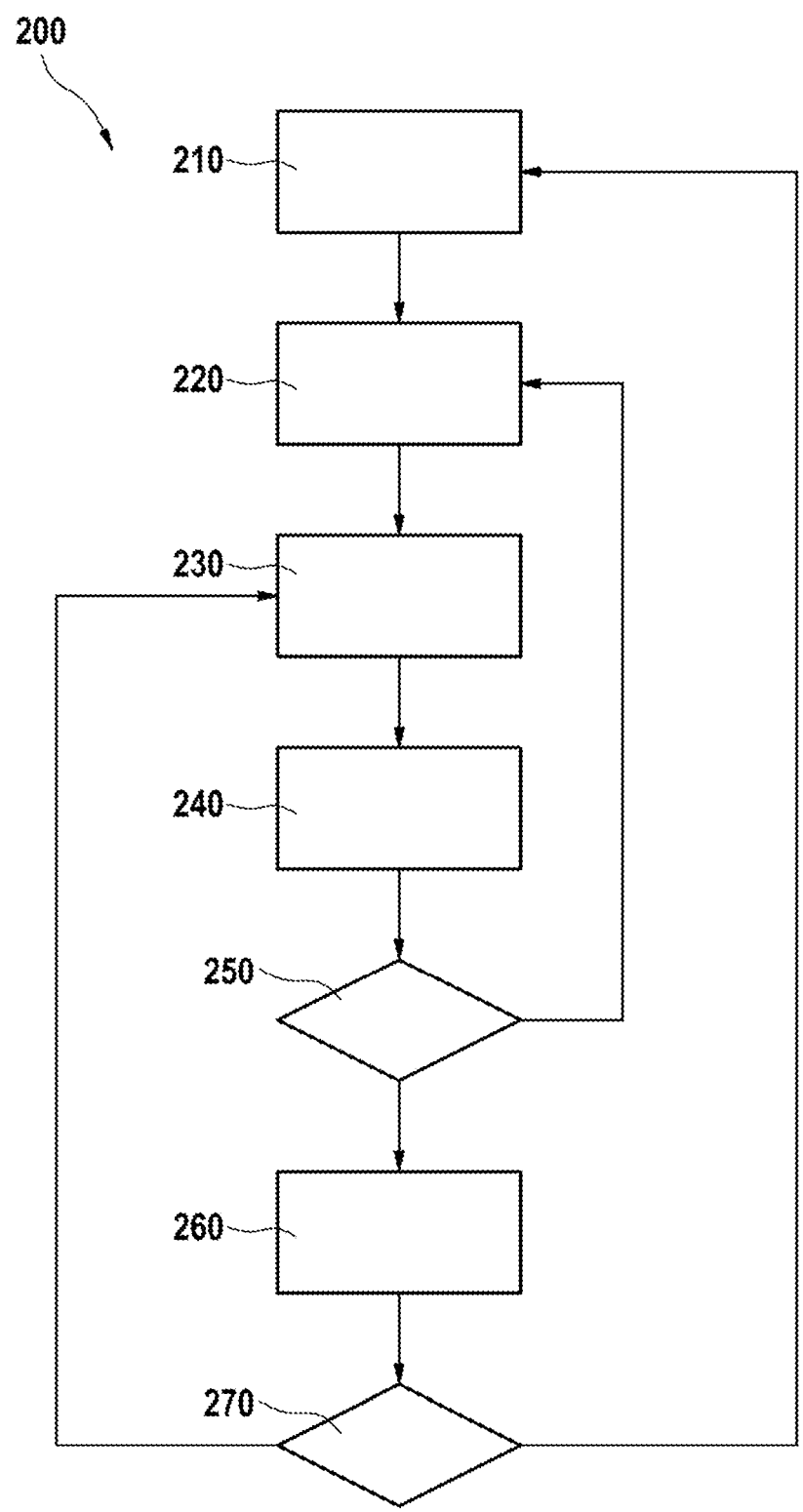
FIG. 2 shows an advantageous configuration of a method according to the invention in the form of a highly simplified flow diagram.

In FIG. 2, a configuration of a method according to the invention is illustrated in the form of a highly simplified flow diagram and is denoted as a whole by 200.

In a first step 210 of the method 200, a target fill level profile of at least one exhaust-gas component that is emitted by the internal combustion engine 120 during the operation thereof is specified. Here, it is in particular the case that, over the course of time, the target fill level fluctuates between an upper and a lower threshold value. In preferred configurations of the method 200, these upper and lower threshold values are specified in the step 210. The target fill level profile is in this case preferably specified so as to run around an average value which lies at an optimum with regard to a conversion capability of the catalytic converter 130. In other words, the average value with respect to time of the target fill level of the catalytic converter 130 that fluctuates in accordance with the target fill level profile preferably lies in the center of the catalytic converter window.

In a step 220, the present fill level of the catalytic converter 130 is determined. This is performed on the basis of a theoretical catalytic converter model, into which, in particular, measured values of the sensors 145, 147 mentioned with regard to FIG. 1 are input as input variables. For example, the present fill level of the catalytic converter 130 is modeled on the basis of a signal of a lambda probe upstream of the catalytic converter 130. If appropriate, a temperature or temperature distribution within the catalytic converter 130, and/or an exhaust-gas mass flow downstream of the internal combustion engine, may also be input into the modeling of the present fill level.

In a step 230, the internal combustion engine 120 is controlled so as to generate an exhaust gas whose composition is suitable for minimizing a deviation between the present target fill level in accordance with the target fill level profile specified in step 210 and the present fill level ascertained in step 220. If, for example, the present fill level of the exhaust-gas component oxygen in the catalytic converter 130 is lower than it should be in accordance with the target fill level profile, the internal combustion engine is controlled so as to generate a lean exhaust gas. In particular, for this purpose, the composition of an air-fuel mixture fed to the internal combustion engine 120 can be influenced, or ignition times of the internal combustion engine can be adapted accordingly.

In a step 240 of the method 200, a present operating state of the catalytic converter 130 is determined. In particular, here, a present composition of the exhaust gas downstream of the catalytic converter 130 can be determined. For this purpose, use may for example be made of an exhaust-gas sensor 147 that is arranged downstream of the catalytic converter 130.

In a step 250, it is checked whether the present operating state corresponds to the modeled operating state and/or whether a threshold value, in particular of a concentration of an exhaust-gas component, has been undershot. If this is the case, then the method 200 returns to the step 220. If the fill level modeled in step 220 and the exhaust-gas composition downstream of the catalytic converter 130 as ascertained in step 240 do not correlate, or if the concentration threshold value is overshot, then in a step 260, an error counter is iterated, and it is checked in a step 270 whether the error counter has overshot a threshold value. Such a concentration threshold value may, as discussed in the introduction, be selected so as to indicate an impending departure from the catalytic converter window, such that an impending breakthrough can be identified in good time before an actual breakthrough occurs. In advantageous configurations, a measured value of the lambda probe 147 downstream of the catalytic converter 130 is not imperatively necessary for such an evaluation, because an impending breakthrough of non-converted exhaust gas can already be identified on the basis of the catalytic converter model. The abovementioned error counter may for example be provided in the form of a timer which begins to run upon every iteration of the error counter and, after a predetermined or settable period of time, for example in a range between 5 seconds and 5 minutes, resets the counter value of the error counter to 0. If the threshold value of the error counter has not been overshot, the method 200 returns to the step 230 and controls the internal combustion engine 120 with changed control parameters such that the deviation between the modeled and actual operating state is minimized or such that the concentration threshold value is undershot. However, if it is identified in the step 270 that the threshold value of the error counter has been overshot, then the method 200 returns to the first step 210 and changes the target fill level profile, in particular the upper and/or lower threshold values, such that the modulation in accordance with the new target fill level profile makes an overshooting of the concentration threshold value less likely. The threshold value of the error counter may for example be 1, 2 or 3 such that, in the event of at least two occurrences of non-correspondence of modeled and real catalytic converter state or overshooting of the concentration threshold value, the modulation of the target fill level of the catalytic converter is adapted accordingly.

In this way, the modulation can be flexibly adapted to an aging state of the catalytic converter 130 and to present operating conditions, for example an outside temperature, an exhaust-gas temperature, a load demand or the like. According to the invention, this is possible without external intervention such that, in particular, no readjustment is necessary, with the method rather being correspondingly self-regulating. In this way, the service life of the catalytic converter can be increased without additional maintenance costs, and at the same time pollutant emissions can be reduced.

It is to be emphasized that, in the use of the method according to the invention, an adaptation in the event of an actual breakthrough is the absolute exception. It is rather the case that, already in the event of impending breakthroughs, which can be identified by means of the state parameters of the catalytic converter model, the fill level modulation is adapted such that the respectively impending breakthrough is firstly averted and is secondly made less likely in future.

The invention claimed is:

1. A method (200) for controlling an internal combustion engine (120) with a catalytic converter (130) for exhaust-gas aftertreatment, the method comprising:
   specifying (210) a target fill level profile that specifies a modulation of a present target fill level between an upper threshold value and a lower threshold value over time of at least one exhaust-gas component that can be stored in the catalytic converter (130),
   determining (220) a present fill level of the at least one exhaust-gas component in the catalytic converter (130) based on a theoretical catalytic converter model,
   operating (230) the internal combustion engine (120) so as to generate an exhaust gas with a target concentration of the at least one exhaust-gas component such that a deviation between the present fill level and the present target fill level in accordance with the target fill level profile is reduced, and
   adjusting the modulation of the present target fill level in response to determining an impending breakthrough by modifying either or both of the upper threshold value and the lower threshold value.

2. The method (200) according to claim 1, wherein the determination of the present fill level comprises a determination of the fill level of multiple sub-volumes of the catalytic converter (130), which are arranged in series in an exhaust-gas flow direction, and the control of the internal combustion engine (120) is performed such that a greatest deviation between the determined fill level of a sub-volume of the multiple sub-volumes of the catalytic converter (130) and the present target fill level thereof is reduced.

3. The method (200) according to claim 1, wherein the lower threshold value is dynamically selected such that a minimum component delivery capacity of the catalytic converter (130) is not undershot.

4. The method (200) according to claim 3, comprising an immediate implementation of a change between raising and lowering of the present target fill level independently of the specified target fill level profile if an undershooting of the minimum component delivery capacity of the catalytic converter (130) is impending or if an overshooting of a maximum component storage capacity of the catalytic converter (130) is impending.

5. The method (200) according to claim 4, comprising a reduction in size of a value range enclosed by the upper and the lower threshold value of the target fill level profile if an undershooting of the minimum component delivery capacity of the catalytic converter (130) is impending, or an overshooting of the maximum component storage capacity of the catalytic converter (130) is impending, and/or the concentration overshoots an upper concentration threshold value or an overshooting of the upper concentration threshold value by the concentration is impending or the concentration undershoots a lower concentration threshold value or an undershooting of the lower concentration threshold value by the concentration is impending, at least two times within a specifiable period of time.

6. The method (200) according to claim 1, wherein the upper threshold value is dynamically selected such that a maximum component storage capacity of the catalytic converter (130) is not overshot.

7. The method (200) according to claim 1, comprising a determination (240) of a concentration of the at least one exhaust-gas component downstream of the catalytic converter (130) based on a measured value, and a comparison (250) of the concentration with an upper and a lower concentration threshold value, wherein a change between raising and lowering of the present target fill level in accordance with the specified target fill level profile is performed only if this forces the concentration away from a closest concentration threshold value.

8. The method (200) according to claim 7, comprising an immediate implementation of the change between raising and lowering of the present target fill level independently of the specified target fill level profile if the upper concentration threshold value is overshot or an overshooting of the upper concentration threshold value is impending or the lower concentration threshold value is undershot or an undershooting of the lower concentration threshold value is impending, and updating of the theoretical catalytic converter model using the measured value.

9. The method (200) according to claim 1, wherein the present fill level is in each case in relation to a maximum storage or delivery capacity of the catalytic converter (130) with regard to the at least one exhaust-gas component.

10. The method (200) according to claim 1, wherein the upper threshold value is less than one and the lower threshold value is greater than zero.

11. The method (200) according to claim 1, comprising a determination of the upper and lower threshold.

12. An electronic processing unit (140) which is configured to specify (210) a target fill level profile that specifies a modulation of a present target fill level between an upper threshold value and a lower threshold value over time of at least one exhaust-gas component that can be stored in a catalytic converter (130),
   determine (220) a present fill level of the at least one exhaust-gas component in the catalytic converter (130) based on a theoretical catalytic converter model,
   operate (230) an internal combustion engine (120) so as to generate an exhaust gas with a target concentration of the at least one exhaust-gas component such that a deviation between the present fill level and the present target fill level in accordance with the target fill level profile is reduced, and
   adjust the modulation of the target fill level in response to determining an impending breakthrough by modifying either or both of the upper threshold value and the lower threshold value.

13. A vehicle having the internal combustion engine (120), the catalytic converter (130), and the electronic processing unit (140) according to claim 12.

14. A non-transitory-computer readable medium containing instructions that when executed by a computer cause the computer to
   specify (210) a target fill level profile that specifies a modulation of a present target fill level between an upper threshold value and a lower threshold value, of at least one exhaust-gas component that can be stored in a catalytic converter (130),
   determine (220) a present fill level of the at least one exhaust-gas component in the catalytic converter (130) based on a theoretical catalytic converter model,
   control (230) an internal combustion engine (120) so as to generate an exhaust gas with a target concentration of the at least one exhaust-gas component such that a deviation between the present fill level and the present target fill level in accordance with the target fill level profile is reduced, and
   adjust the modulation of the present target fill level in response to determining an impending breakthrough by modifying either or both of the upper threshold value and the lower threshold value.

\* \* \* \* \*